(No Model.)  2 Sheets—Sheet 1.

F. FISCHER.
STEAM ENGINE.

No. 384,246. Patented June 12, 1888.

Witnesses:
C. S. Hudgens
R. H. Orwig

Inventor:
Freidrich Fischer,
By Thomas G. Orwig, Attorney.

N. PETERS, Photo-Lithographer, Washington, D. C.

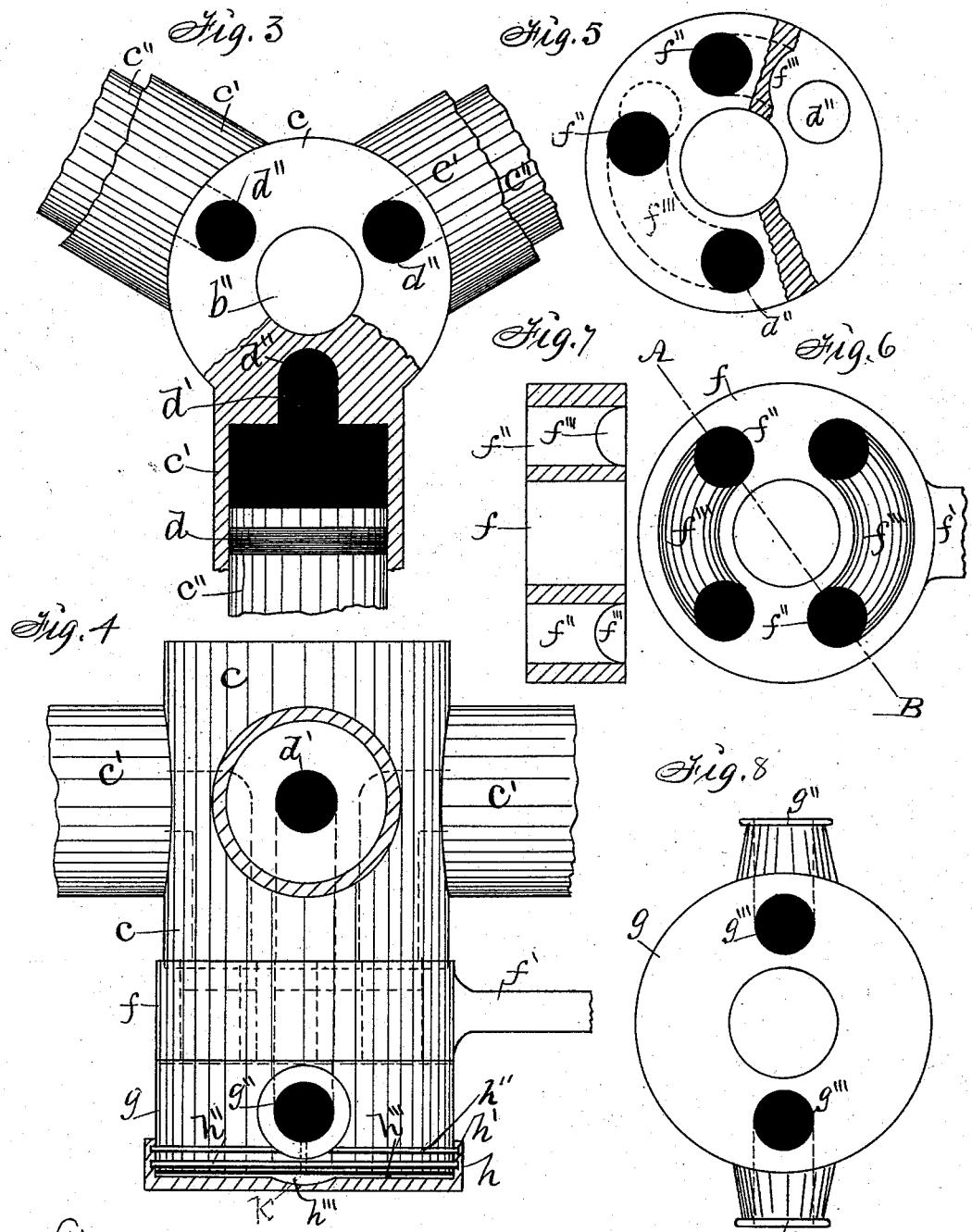

UNITED STATES PATENT OFFICE.

FRIEDRICH FISCHER, OF DES MOINES, IOWA.

STEAM-ENGINE.

SPECIFICATION forming part of Letters Patent No. 384,246, dated June 12, 1888.

Application filed July 26, 1887. Serial No. 245,333. (No model.)

*To all whom it may concern:*

Be it known that I, FRIEDRICH FISCHER, a citizen of the United States, residing at Des Moines, county of Polk, and State of Iowa, have invented a new and useful Steam-Engine, of which the following is a specification.

The object of my invention is to provide a simple reversible engine of small or intermediate power at a cost much below the ordinary form of engines; and it consists of a metal ring mounted in a frame with legs for support, within which ring is a cored hub with tubular spokes upon a shaft parallel and eccentric with the axis of the ring. This shaft has bearings in the frame which supports the ring, and the tubular spokes of the hub form cylinders, which are connected with ports to those in the hub. The spokes or cylinders are provided with pistons, which move in and out and bear against the ring. The end of the hub is fitted with a valve upon the shaft, and upon the shaft back of the valve is the steam-chest, receiving both the eduction and exhaust pipes.

My invention is illustrated in the accompanying drawings, in which—

Figure 1:
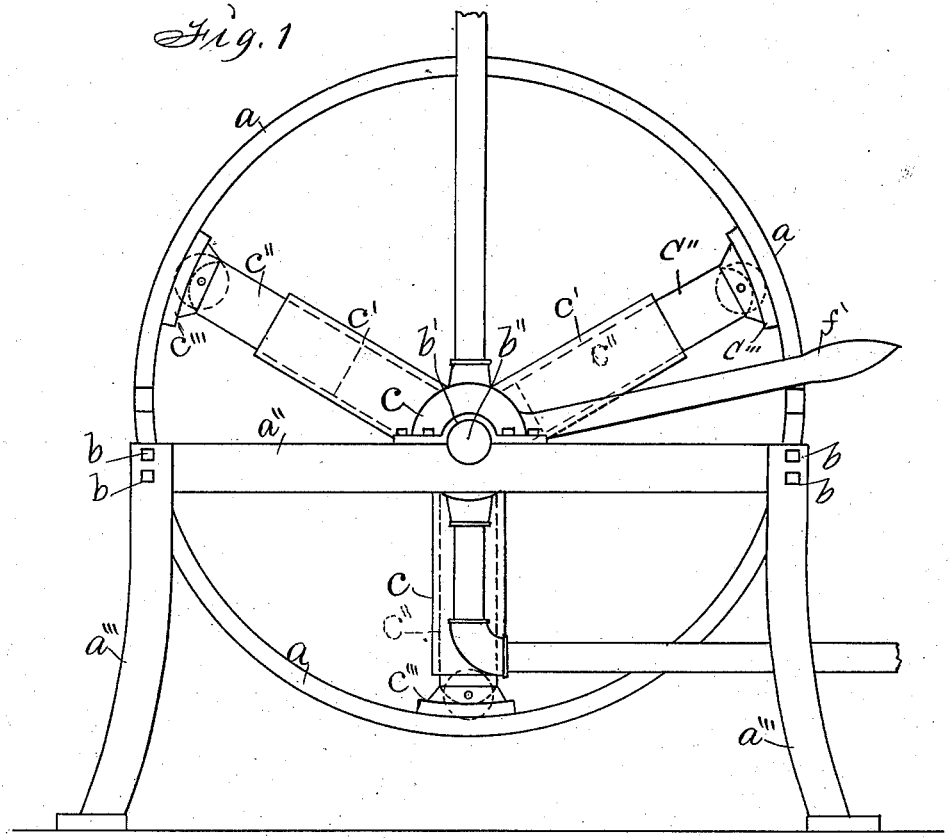
Figure 2:
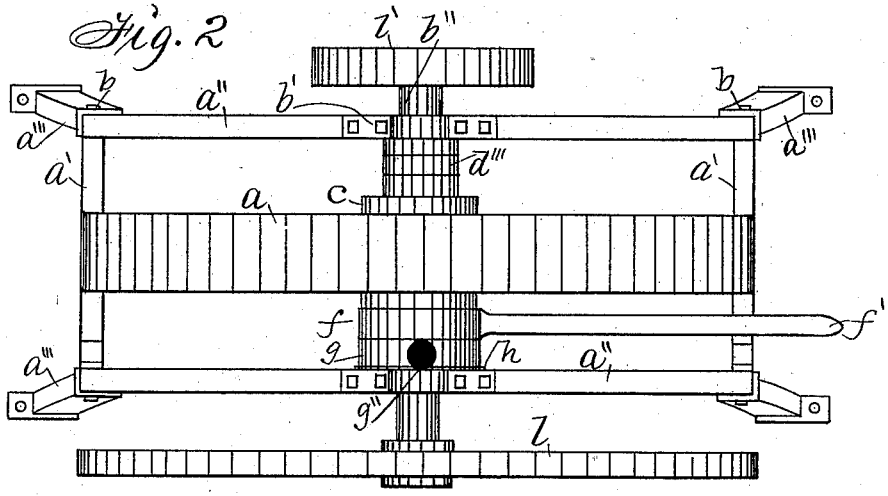

Figures 1 and 2 are side and top views of the complete machine, the fly-wheel being removed from Fig. 1. Fig. 3 is an end view of the hub, showing ports. Fig. 4 is a side view of hub with valve, steam-chest, and balance-pressure packing-box; Fig. 5, an end view of hub with valve partially broken away; Fig. 6, the valve, showing the inner face, which joins the end of the hub; Fig. 7, a sectional view of valve in Fig. 6 on line A B; Fig. 8, a detail of steam-chest, showing the face which joins with the valve in Figs. 4 and 6.

The ring $a$ is cast integral with the parts $a'$ of the frame. The ends of the pieces $a'$ are joined by the bars $a''$, completing a rectangular frame, which is supported upon legs $a''''$, attached to the frame by screw-bolts $b$, which pass through the legs $a''''$ and bars $a''$ into the ends of the pieces $a'$, holding the whole firmly together. Midway between end and end of the bars $a''$ are bearings $b'$, which carry the shaft $b''$, which is set parallel with but eccentric to the axis of the ring $a$.

Upon the shaft $b''$ and within the plane of the ring $a$ is a hub, $c$, having cylindrical spokes $c'$, (in this case three, and preferably an odd number,) which are bored out smoothly and open at their outer ends to admit pistons $c''$, having on their outer ends shoes or rollers $c'''$, which slide or roll in contact with the inner surface of the ring $a$. The inner ends of the pistons $c''$ are provided with stuffing or packing rings $d$, as shown in Fig. 3, to prevent the escape and loss of steam.

In the bottom of the cylinders $c'$ round holes or ports $d'$, Figs. 3 and 4, are bored in toward the center of the hub $c$ until they intersect holes or ports $d''$, which are bored into the end of the hub $c$ with their centers in the same plane as the axis of the cylinders $c'$. The holes or ports $d''$ extend only half through the hub $c$, terminating in the holes $d'$, thus forming a continuous passage from the end of the hub through into the cylinders. The opposite end of the hub $c$ is solid and is kept from being pressed against the frame $a''$ by the rings $d'''$, placed on the shaft $b''$.

On the shaft $b''$ and against the bored face of hub $c$ is a valve, $f$, with handle $f'$ and four holes, $f''$, which pass entirely through $f$ and are connected in pairs by the grooves $f'''$ in the surface of $f$, which impinges on $c$. One pair of these holes $f''$ are farther apart than the others, making the grooves $f'''$ longer between one pair than the other. This is shown in Fig. 6, the longer groove being the exhaust, the shorter one the feed.

Outside of the valve $f$ on the shaft $b''$ is a ring or steam-chest, $g$, with holes $g'$ and $g''$ bored into its edge diametrically opposite until they intersect holes $g'''$, bored into its face with centers in the same plane. At $g'$ the feed or induction pipe is attached, and at $g''$ the exhaust-pipe. The holes $g'''$ pass only half-way through the ring $g$, terminating in $g'$ and $g''$ and opening on the surface of $g$, which rests against the back of $f$.

When steam is admitted at $g'$ and the valve $f$ thrown over by means of the handle $f'$ until the hole $f''$ at the lower terminus of the shorter groove $f'''$ comes in line, the full boiler-pressure is exerted upon the hub $c$ throughout the length of the shorter or feed groove $f'''$. When one of the ports $d''$ of the hub $c$ comes in line with $f''$, as shown in Fig. 5, steam is admitted into the cylinders $c'$ and the pistons $c''$ forced out against the ring $a$, which forms the resistance from which they get their rotary motion. Each piston receives full pressure while traveling the entire length of the feed-groove $f'''$, and between the upper termini of the feed and exhaust grooves the expansive pressure of the steam only is exerted. When each cylinder $c'$ rotates successively into contact with the exhaust-groove, the steam exhausts through $g''$, removing the balance pressure on the pistons $c''$ during their descent. To reverse the engine, the valve $f$ is thrown over by the handle $f'$ until the upper terminus of the feed-groove $f'''$ rests to the right of the common diameter of ring $a$ and hub $c$.

To prevent the pressure between ring $g$ and hub $c$ from producing leakage on either side of $f$ by springing the bars $a''$ laterally, a balance-pressure packing-box, $h$, is fitted to the back side of ring $g$. It is constructed, as illustrated in Figs. 2 and 4, of larger diameter than $g$ and with the flange or rim $h'$ to fit closely around $g$, within which rim $h'$ are packing-rings $h''$, having behind them in $h$ the space $h'''$, which is filled with steam from $g'$ through the small port $k$, thus allowing the spring of the bars $a''$ to be taken up in the box $h$; or, in other words, the box $h$, in the form of a cap, is a compensating device that follows the outward motions of the yielding bar $a''$, while the steam within the cap or box $h$ presses in a reverse way and prevents separation and leakage between the parts $c$, $f$, and $g$.

$l$ and $l'$ in Fig. 2 are the fly-wheel and belt-pulley.

I claim as my invention—

1. The combination of ring $a$, pieces $a'$ $a''$, and legs $a'''$, bolts $b$, bearings $b'$, shaft $b''$, wheels $l$ and $l'$, rings $d'''$, hub $c$, with cylinders $c'$, pistons $c''$, rollers $c'''$, packing-rings $d$, ports $d'$ and $d''$, valve $f$, with handle $f'$, ports $f''$, and grooves $f'''$, ring $g$, with ports $g'$, $g''$, and $g'''$, box $h$, with rim $h'$, rings $h''$, space $h'''$, and small port $k$, substantially as and for purposes stated.

2. The combination of the ring $a$, with rollers $c'''$, pistons $c''$, cylinders $c'$, hub $c$, ports $d'$ and $d''$, valve $f$, ports $f''$, grooves $f'''$, the ring $g$, with ports $g'$, $g''$, and $g'''$, and box $h$, with rim $h'$, rings $h''$, space $h'''$, and port $k$, substantially as set forth, for purposes stated.

3. The combination of shaft $b''$, hub $c$, cylinders $c'$, pistons $c''$, rollers $c'''$, with ports $d'$ and $d''$, the valve $f$, with ports $f''$ and groove $f'''$, the ring $g$, with ports $g'$, $g''$, and $g'''$, substantially as and for the purposes stated.

4. The combination of pistons $c''$, cylinders $c'$, hub $c$, and shaft $b''$, with valve $f$, ring $g$, and box $h$, substantially as and for the purposes stated.

5. The combination of ring $g$, with ports $g'$ and $k$, and the box $h$, with rim $h'$, rings $h''$, and space $h'''$, substantially as and for purposes stated.

FRIEDRICH FISCHER.

Witnesses:
C. D. HUDYENS,
THOMAS G. ORWIG.